United States Patent [19]
Lodetti et al.

[11] Patent Number: 5,824,985
[45] Date of Patent: Oct. 20, 1998

[54] APPARATUS FOR TILTABLY GUIDING ELECTRODES IN ELECTRO EROSION MACHINE

[75] Inventors: Attilio Lodetti, Losone; Hansjürg Etter, Orselina; Karl Tobler, Maggia, all of Switzerland

[73] Assignee: AGIE SA, Losone, Switzerland

[21] Appl. No.: 602,898

[22] Filed: Feb. 16, 1996

[30] Foreign Application Priority Data

Feb. 27, 1995 [DE] Germany ............... 195 06 775.4

[51] Int. Cl.[6] ............................................. B23H 7/10
[52] U.S. Cl. ................................................ 219/69.12
[58] Field of Search ................. 219/69.12; 204/224 M

[56] References Cited

U.S. PATENT DOCUMENTS

| | | | |
|---|---|---|---|
| 3,849,624 | 11/1974 | Dulebohn et al. . | |
| 4,363,949 | 12/1982 | Pfau et al. ............. | 219/69.12 |
| 4,431,896 | 2/1984 | Lodetti . | |
| 4,460,816 | 7/1984 | Bonga . | |
| 4,461,942 | 7/1984 | Delpretti ............. | 219/69.12 |
| 4,485,288 | 11/1984 | Schneider ............. | 219/69.12 |
| 4,677,270 | 6/1987 | Medici et al. ............. | 219/69.12 |
| 4,751,362 | 6/1988 | Girardin ............. | 219/69.12 |
| 4,883,934 | 11/1989 | Mamin et al. ............. | 219/69.12 |
| 4,885,449 | 12/1989 | Suzuki et al. . | |
| 5,012,063 | 4/1991 | Kawanabe et al. ............. | 219/69.12 |
| 5,015,814 | 5/1991 | Morishita ............. | 219/69.12 |
| 5,519,181 | 5/1996 | Hsu ............. | 219/69.12 |

FOREIGN PATENT DOCUMENTS

| | | |
|---|---|---|
| 2 357 519 | 12/1974 | Germany . |
| 30 41 612 C1 | 8/1986 | Germany . |
| 35 11 929 A1 | 12/1986 | Germany . |
| 37 90 662 C2 | 1/1991 | Germany . |
| 62-176716 | 8/1987 | Japan . |
| 01295717 A | 11/1989 | Japan . |

OTHER PUBLICATIONS

Alfred Böge, "Das Techniker Handbuch", Freidr. Vieweg & Sohn 1983.

*Primary Examiner*—Geoffrey S. Evans
*Attorney, Agent, or Firm*—Darby & Darby

[57] ABSTRACT

An electroerosion apparatus is disclosed having an upper and a lower tiltable electrode guide assembly, each are independently tiltable about a first and a second tilt axis. Both tilt axes are each associated with tilt drives. Each tilt drive includes a servo motor mounted outside the machining zone and connected to the tiltable electrode guide assemblies.

14 Claims, 4 Drawing Sheets

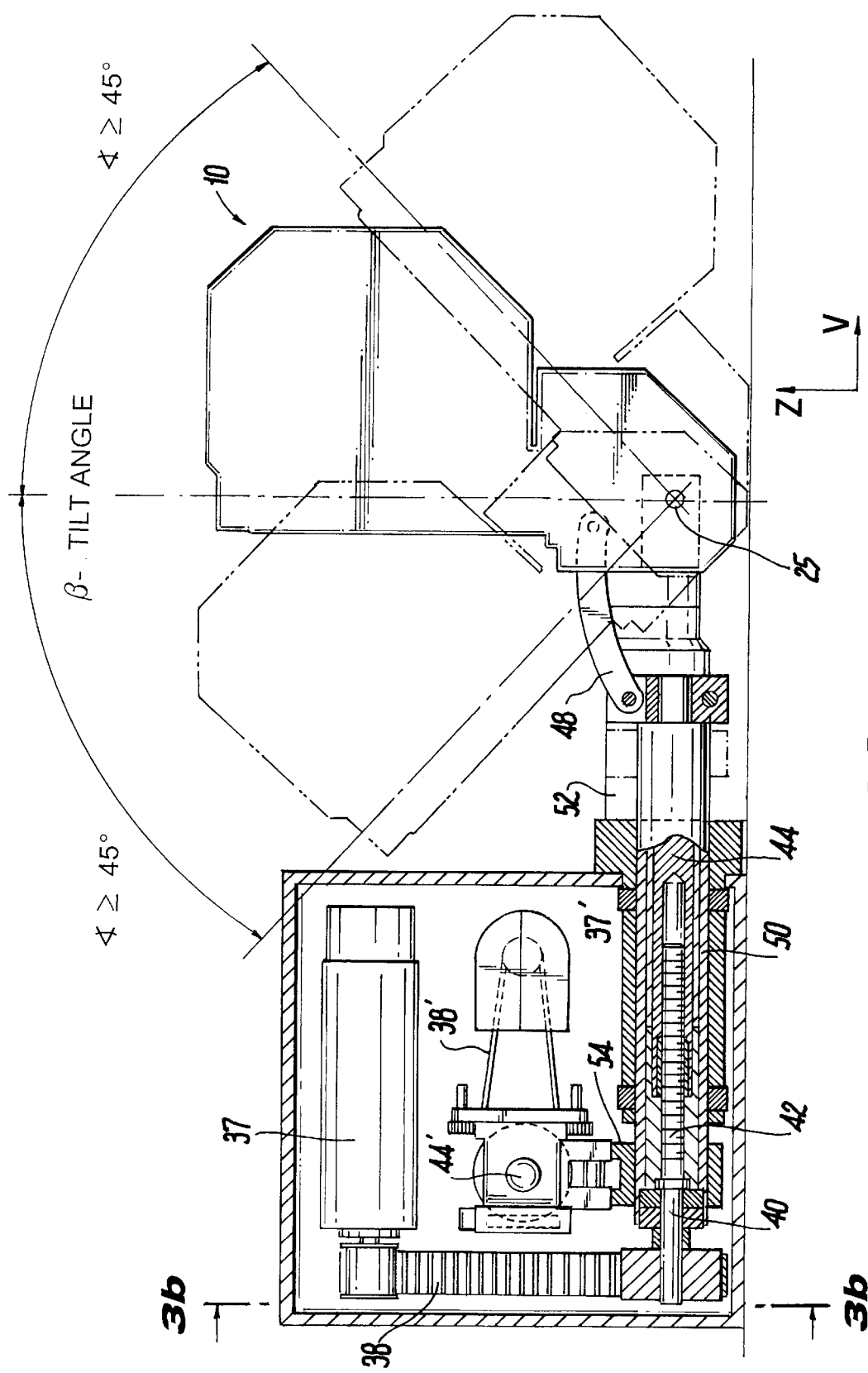

APPARATUS FOR TILTABLY GUIDING ELECTRODES IN ELECTRO EROSION MACHINE

BACKGROUND OF THE INVENTION

1. Field of the Invention

The invention relates to an electroerosion apparatus, in particular a wire-cut erosion apparatus, comprising at least one tiltable electrode guide assembly—positioned on a support arm—for a working electrode, and one tilt drive—comprising a servo motor—per tilt axis or tilt angle.

A wire-cut erosion apparatus cuts a contour into a workpiece using a wire electrode, after a starting hole has been drilled, with the workpiece clamped inside a processing zone of the wire-cut erosion apparatus. The electrode is guided precisely and under axial tension through the workpiece between two wire guide assemblies, in order to provide the wire electrode with an defined and geometrically controllable processing orientation relative to the workpiece to be eroded. An X/Y which is coupled to the workpiece, provides the relative movement—which is essential for cutting and which determines the cut profile—between the workpiece and the erosion wire. An additional U/V which is coupled to one of the wire guide assemblies, is provided for conical cuts, sometimes also an additional Z for movement of the assemblies in the Z direction.

2. Description of the Related Art

An electroerosion apparatus of the design described above, is known, for example, from DE-C1-30 41 612. Therein, the electrode guide assemblies, more accurately wire guide are tiltably supported—about two tilt axes—in a C-shaped machine frame at the front ends of guide arms. For the tilt motion of the wire guide assemblies, tilt drives are provided in their close proximity. The tilt drives essentially consist of a servo motor whose shaft directly engages the tilt axes of the wire guide assemblies. This arrangement has the disadvantage that the tilt drives, at least the one for the lower wire guide assembly, are immersed during processing in a dielectric flushing liquid which surrounds the cutting zone. This leads to an accelerated chemical decay of the tilt drives, e.g. through corrosion, but also to mechanical wear, e.g. through particles which are released from the workpiece during the erosion processing and enter the tilt drives.

DE-A1-32 01 544 shows an electroerosion apparatus comprising wire guide assemblies which are positioned coaxially with a certain spatial separation, and forced-coupled for the tilt motion. The forced coupling is achieved via parallelogram levers, through which the two wire guide assemblies are forcibly coupled. Each wire guide assembly is provided with its own parallelogram fork, and the two parallelogram forks are connected via a common vertical axis. This vertical axis is oriented parallel to the electrode section between the wire guide assemblies and is, in addition, telescopically extendible. The parallelogram lever is coupled to the U/V of the erosion apparatus for proper coaxial alignment of the wire guide assemblies. This arrangement, however, has the disadvantage that the vertical axis can only have a limited separation from the processing electrode, depending on the length of the parallelogram forks. This, however, limits the processing range of the electroerosion machine, which makes it unsuitable for the processing of larger workpieces. If the parallelogram lever is unduly lengthened, then the exact alignment of the wire guide assemblies will be adversely affected by thermal expansion, measurement errors, and play. In addition, the coupling of the parallelogram levers to the U/V for the control of conic cuts may not allow an exact alignment of the wire guide assemblies. Setting up the electroerosion machine for conic cuts is therefore particularly time-consuming.

SUMMARY OF THE INVENTION

The object of the invention is to improve the electroerosion apparatus of the aforementioned type, such that a precise tilt of the electrode guide assembly is possible—without limiting the processing range.

According to the invention, the servo motors for the tilt drives in an electroerosion apparatus of the aforementioned type, especially for the lower tilt drive, are positioned outside the processing zone and are mechanically linked to the corresponding electrode guide assembly. This offers more freedom of choice in the construction of the entire electroerosion apparatus. As a result, the entire processing zone between the electrode guide assemblies can be utilized, in particular for processing larger workpieces.

In addition, the tilt drives are less susceptible to malfunction, because the servo motors do not come in contact with the dielectric flushing fluid. Furthermore, accidental mechanical collisions between the workpiece—during movement of the X/Y—and the servo motors of the tilt drives are eliminated. Also, the accuracy of the tilt drives is much less affected by thermal effects, e.g. as a result of heating of the flushing fluid.

In a wire-cut erosion machine with two wire guide assemblies, i.e. with an upper assembly which is positioned before the workpiece in reference to the direction of the wire feed, and with a lower assembly, which is positioned after the workpiece in reference to the direction of the wire feed, these wire guide assemblies are independently tiltable about two separate tilt axes. This arrangement makes it easier to mount the components of the tilt drives as well as to exchange individual components, and simplifies the adjustment of the coaxial alignment of the guide assemblies. According to the invention, the system is characterized by its high mechanical stiffness and by the resulting high accuracy of the aligned wire guide assemblies, even for tilt angles in excess of 45°. The tilt systems which were described above and are known in the art, have been found to be inaccurate, particularly for these large tilt angles, due to the large pulling force exerted on the wire guide assemblies by the wire electrode.

In principle, the servo motors which are associated with the electrode guide assembly or assemblies, can be located at an arbitrary location outside the processing zone of the electroerosion apparatus, since the mechanical linkage with the tilt axis of the electrode guide assembly can be arbitrarily long. In a preferred embodiment, for each electrode guide assembly an electrically controlled servo motor is provided for each tilt angle, wherein the servo motor is positioned inside or on the machine frame of the electroerosion apparatus and connected to the corresponding electrode guide assembly via the guide arm.

In another embodiment, the servo motors are linked to the preferably Cardanic tilt axes of the electrode guide assembly via a linear gear—which generates a translational motion—, e.g. a rack-and-pinion or a screw gear. Preferably, the linear gear is, in addition, coupled to a helical gear and/or a toothed belt gear.

Preferably, the linear gear comprises the following elements: a—rotatably supported—rotating shaft which is driven by the motor shaft of the servo motor; a—translatably supported—sliding shaft coupled to the rotating shaft via a gear, such that the rotating motion of the rotating shaft is transformed into a linear motion of the sliding shaft, whereby the sliding shaft is flexibly connected to the electrode guide assembly via a hinge lever. Such a coupling between a servo motor and the corresponding electrode guide assembly does not exhibit slip and displays high reliability and a long lifetime, requires minimal maintenance and is tolerant against overloads, has a small footprint, and is highly efficient.

In an embodiment of a particular simple design, the rotating shaft is provided with an external thread, more precisely called an external screw thread, which engages an internal thread, more precisely an internal screw thread. By this method, the frequently observed backlash which is most common in helical gears, is averted.

For the automatic adjustment of the tilt position of the electrode guide assembly, there are preferably provided measurement instruments for measuring the tilt angle of the wire guide assembly, such that the output signals of the measurement instruments are supplied to controllers which control the servo motors of the tilt drives. Especially advantageous is the monitoring of the motor shaft of the servo motor via a transmitting tachometer—preferably for transmitting the angular position—which allows an exact determination of the tilt angle if the step-down ratio between the motor shaft movement of the servo motor and the tilt motion of the wire guide assembly is known.

The control of the tilt drives takes into consideration that the translational movement of the sliding shaft and the tilt motion of the wire guide assemblies are not directly proportional to each other. A person skilled in the art will be able to deduce the relationship between the angular position at the servo motor and the angular position of the electrode guide assembly.

The accuracy of the adjustment of the tilt position of the electrode guide assembly is further improved by a mechanical or electronic gear in the servo motor of the tilt drive.

In a particularly preferred embodiment, the corresponding tilt drives for each tilt axis of a specific electrode guide assembly cooperate with each other, such that the sliding shaft of one tilt drive is flexibly coupled to the rotating shaft supporting the electrode guide assembly, of the other tilt drive, possibly via a hinge lever, such that the linear movement of the sliding shaft of one tilt drive is transformed into a rotational motion of the other tilt drive. Hereby, a coupling or linking of two linear drives is realized, wherein the aforementioned rotating shaft transmits the translational motion of the sliding shaft which is generated by one of the tilt drives, to the corresponding electrode guide assembly as a rotational motion.

In an electroerosion apparatus for electroerosive cutting of a workpiece using two tiltable wire guide assemblies according to the invention, the wire guide assemblies are tiltable via electronically controlled servo motors; in addition, one of the wire guide assemblies is—depending on the vertical Z-distance of the wire guide assemblies—translatable via the U/V slide in such fashion, that the wire guide assemblies are coaxial with respect to each other, i.e. they are aligned in relation to each other. Preferably, this is implemented in the design, such that the tilt drives can move jointly with the corresponding wire guide assembly in a linear fashion via the U/V slide.

Further advantages and implementations of the invention will become apparent from the following description of preferred embodiments.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

In the following, the invention will be described on the basis of a wire-cut erosion apparatus. This should not be viewed as a limitation, since the present invention can also be utilized for tilting a die-sinking electrode in an electrode guide assembly of a die-sinking apparatus.

Figure 1:
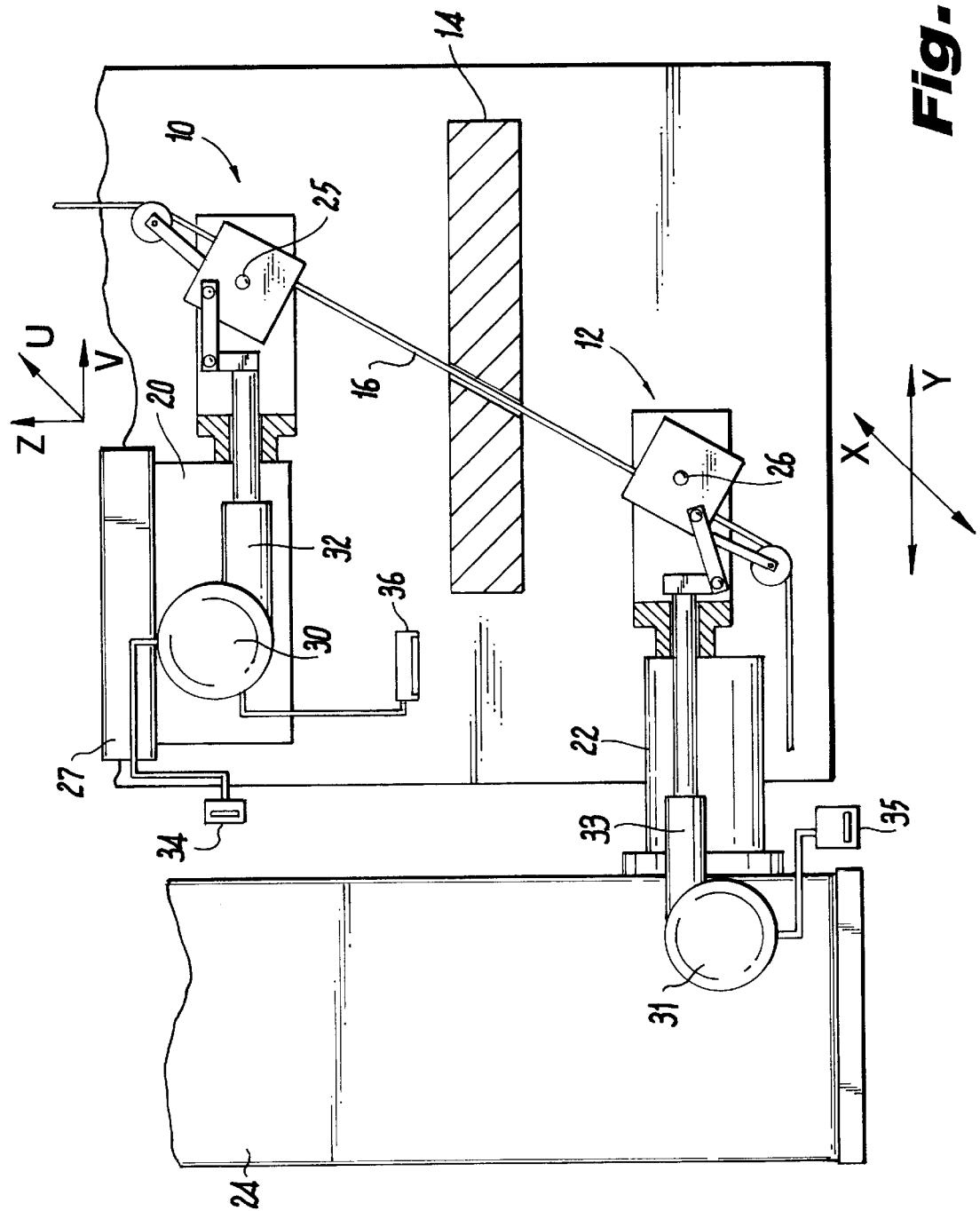
FIG. 1 illustrates a partial sectional view of a wire-cut erosion apparatus according to the invention to illustrate the arrangement of the tilt drives.

FIG. 1 shows schematically the main components of a wire-cut erosion apparatus which are essential for understanding the invention. The terminology used herein is intended to facilitate reading the description, but should not be considered as limiting. For instance, the terms "upper" and "lower" refer to wire-cut erosion apparatus having the usual process orientation and dimensions, with the workpieces arranged in the conventional manner.

FIG. 1 shows schematically a section of the processing or machining zone of a spark erosion cutting apparatus. The apparatus comprises two wire guide assemblies disposed within a certain distance from each other, where the upper guide assembly is labeled 10 and the lower guide assembly is labeled 12. Between the wire guide assemblies 10, 12 which are facing each other, lies the processing zone of the cutting apparatus where a workpiece 14 is clamped to a work table—not shown here—for processing. A wire electrode 16 is guided by the wire guide assemblies 10, 12 into the intended position in relation to the workpiece. In order to obtain a satisfactory erosion result, it is desirable that the wire guide assemblies 10, 12 are coaxially aligned, such that their axes and the wire electrode 16 are positioned along a common line; this alignment should be maintained even when the wire guide assemblies 10, 12 are tilted with respect to the Z axis, which is, for instance, required when a cone is cut.

Both wire guide assemblies 10, 12 are located at the front ends of supporting arms 20, 22 which are attached to a machine frame 24, in this case a C-frame. The wire guide assemblies 10, 12 are tiltable about the U- and V-axes. The tilt bearings 25, 26 form the axes of rotation about the U-axis. The rotating shafts 40 form the axes of rotation about the V-axis. Tilting of the wire guide assemblies 10, 12 about the V-axis results in a rotation by a tilt angle $\alpha$ in a plane defined by the Z- and U-axes. Tilting about the U-axis, on the other hand, results in a rotation by a tilt angle $\beta$ in a plane defined by the Z- and V-axes.

In order to obtain the orientation of the two wire guide assemblies shown in FIG. 1, the upper wire guide assembly 10 is translatable along the U- and V-axes, respectively, via a U/V slide 27, and in addition, tiltable by tilt angles α and β, which determine the tilt position of the wire guide assemblies 10, 12.

The wire guide assemblies 10, 12 are—independently from each other—tiltable by the angles α and β. For this purpose, each wire guide assembly 10, 12 is provided with its own tilt drive for each tilt angle and tilt axis, respectively. Servo motors 30, 31, e.g. stepper motors, of which each motor shaft cooperates with one linear drive 32, 33, are provided for tilting both wire guide assemblies 10, 12 by an angle β. These linear drives 32, 33 generate a translational motion, and their end facing away from the respective servo motor 30, 31 is flexibly attached to the corresponding wire guide assembly 10 or 12. Herein, the point where the shaft 32, 33 is attached to the corresponding wire guide assembly 10, 12, is offset by a certain distance with respect to the pivot point defined by the tilt bearings 25, 26, wherein this offset—in relation to the tilt bearings—is pointing away from the workpiece 14.

In the present example, the servo motors 31 for the tilt drives of the lower wire guide assembly 12 are located far outside the processing zone, namely at the end of the supporting arm 22 on the opposite site of the wire guide assembly 12 which is attached horizontally to the machine frame 24, 27. The shaft 33 extends from the servo motor 31, along the corresponding supporting arm 22, to the respective wire guide assembly 12. The result is that the tilt drives are separated from the wire guide assembly 12, they are, however, integrated with the machine frame 24. The area between the wire guide assemblies 10, 12 is, as a result of this arrangement, freely accessible for processing of the workpiece 14.

A control apparatus 34, 35 is assigned to each of the servo motors 30, 31, which computes for a given angle β and a given cutting height H the necessary values for changing the tilt angle from external data inputs (for instance, via a keyboard or from a numerically controlled machine), and which drives the servo motors 30, 31 as a function of the computed values. In addition, a closed servo loop can also be provided. The tilt angle β is measured via a sensor, e.g. a tachometer sensor 36 cooperating with the motor shaft of the servo motors 30, 31—if the step-down ratio between the motion of the motor shaft and the tilt motion of the respective wire guide assembly 10 and 12, respectively, is known—and transmitted to a controller via an electric control line. From the measured signal and the set point, the controller generates a signal for the servo motor 30 and 31, respectively.

Similarly, the two wire guide assemblies 10, 12 can be tilted about the angle α via their own tilt drives which are associated with the wire guide assemblies 10, 12 and which correspond to the tilt drives 30, 32 and 31 33 described above. The tilt drives for each tilt angle α and β of each of the wire guide assemblies 10, 12 can operate independently on the tilt position of the corresponding wire guide assembly 10, 12. It is also possible to couple the tilt drives mechanically, such that the shaft of one of the tilt drives transmits both a tilt about an angle α as well as a tilt about the angle β.

Figure 2:
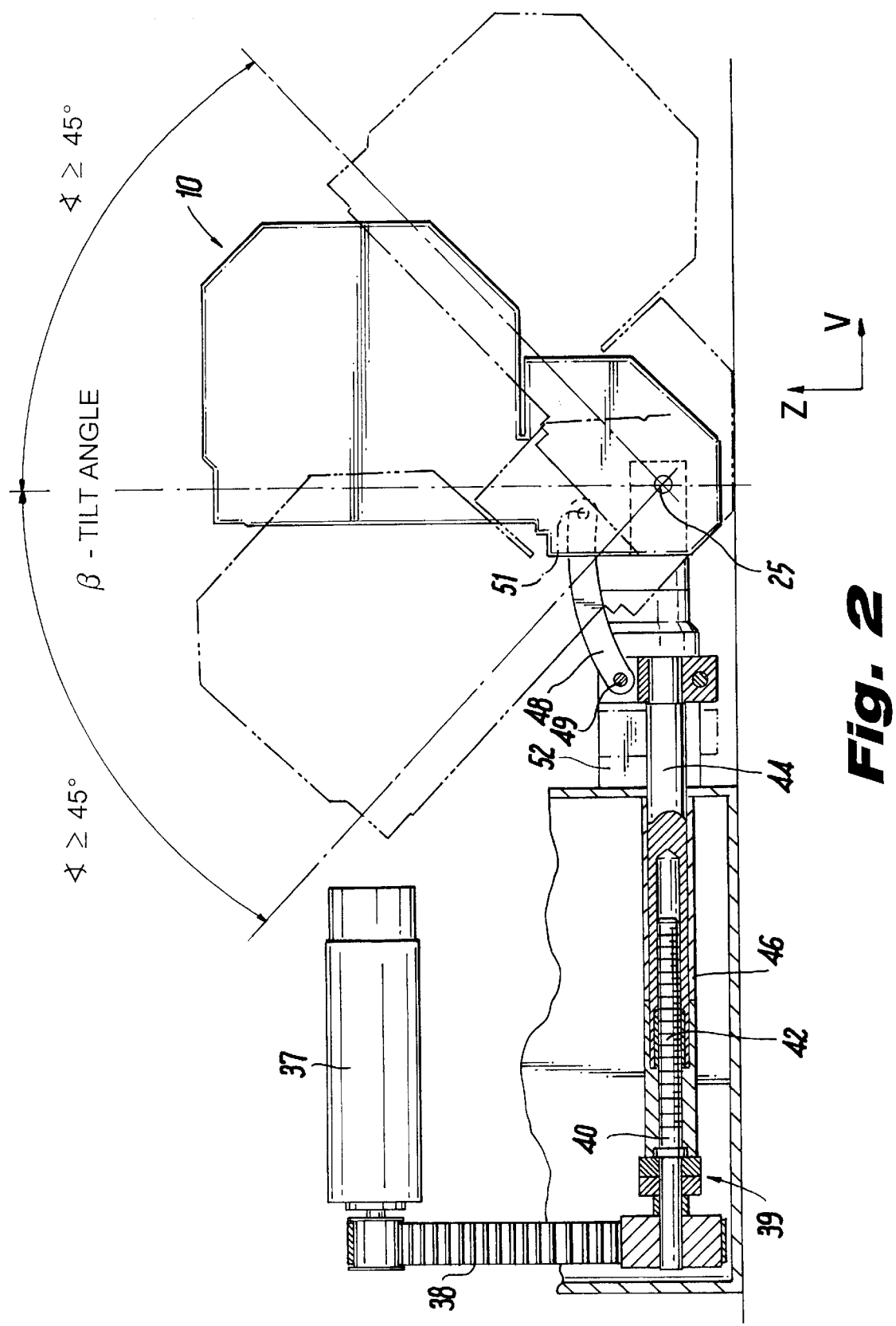
FIG. 2 illustrates a sectional view of a tilt drive according to the invention.

FIG. 2 shows a tilt drive for tilting the upper wire guide assembly 10 of the wire-cut erosion apparatus described in FIG. 1 about a tilt angle β in the plane defined by the Z and V axes. The wire guide assembly 10 is supported in the supporting beam 52 via the tilt bearing 25.

A servo motor 37 is coupled via a belt 38, e.g. a toothed or a flat belt, to a rotating shaft 40 which is rotatably supported by ball bearings 39, such that the rotation of the servo motor shaft is transmitted to the rotating shaft 40. Preferably, the servo motor 37 is provided with an internal electronic or mechanical step-down gear between the motor shaft and the belt pinion gear, in order to provide a better control of the movement of the rotating shaft. The rotating shaft 40 is formed as a cylinder and provided on its outer circumference with a screw thread 42. The outer screw thread 42 engages with a corresponding inner thread on the inner surface of a sliding shaft 44 which is formed as a hollow cylinder. The sliding shaft is translatably supported between two sliding rings 46, such that the rotational motion of the rotating shaft 40 is transformed into a linear motion of the sliding shaft 44 in the V-direction. If the direction of the rotation of the rotating shaft 40 is reversed, then the linear motion of the sliding shaft 44 is also reversed, i.e. it moves in the opposite V-direction. The end of the sliding shaft 44 facing the wire guide assembly 10, is flexibly coupled to the wire guide assembly 10 via a hinge lever 48. Hereby, a first tilt point 49 of the hinge lever 48 on the sliding shaft 44 is offset from the center line of the sliding shaft, and a second tilt point 51 of the hinge lever 48 at the upper wire guide assembly 10 is offset in relation to the tilt point defined by the tilt bearing of the wire guide assembly. As a result, the rotational motion of the motor shaft of the servo motor 37 is transmitted to the rotating shaft 40, then transformed via the aforementioned screw gear into a translational motion of the sliding shaft 44, and finally converted via a hinge lever into a tilt motion of the wire guide assembly 10.

The tilt drive for tilting the lower wire guide assembly 12 about the tilt angle β is essentially constructed in the same fashion. Depending on the arrangement of the tilt drive in or on the machine frame of the wire-cut erosion apparatus, the rotating or sliding shaft 40, 44 may have different dimensions or may possibly be extended via additional extension members. The kinematic principle, however, remains unchanged.

Figure 3B:
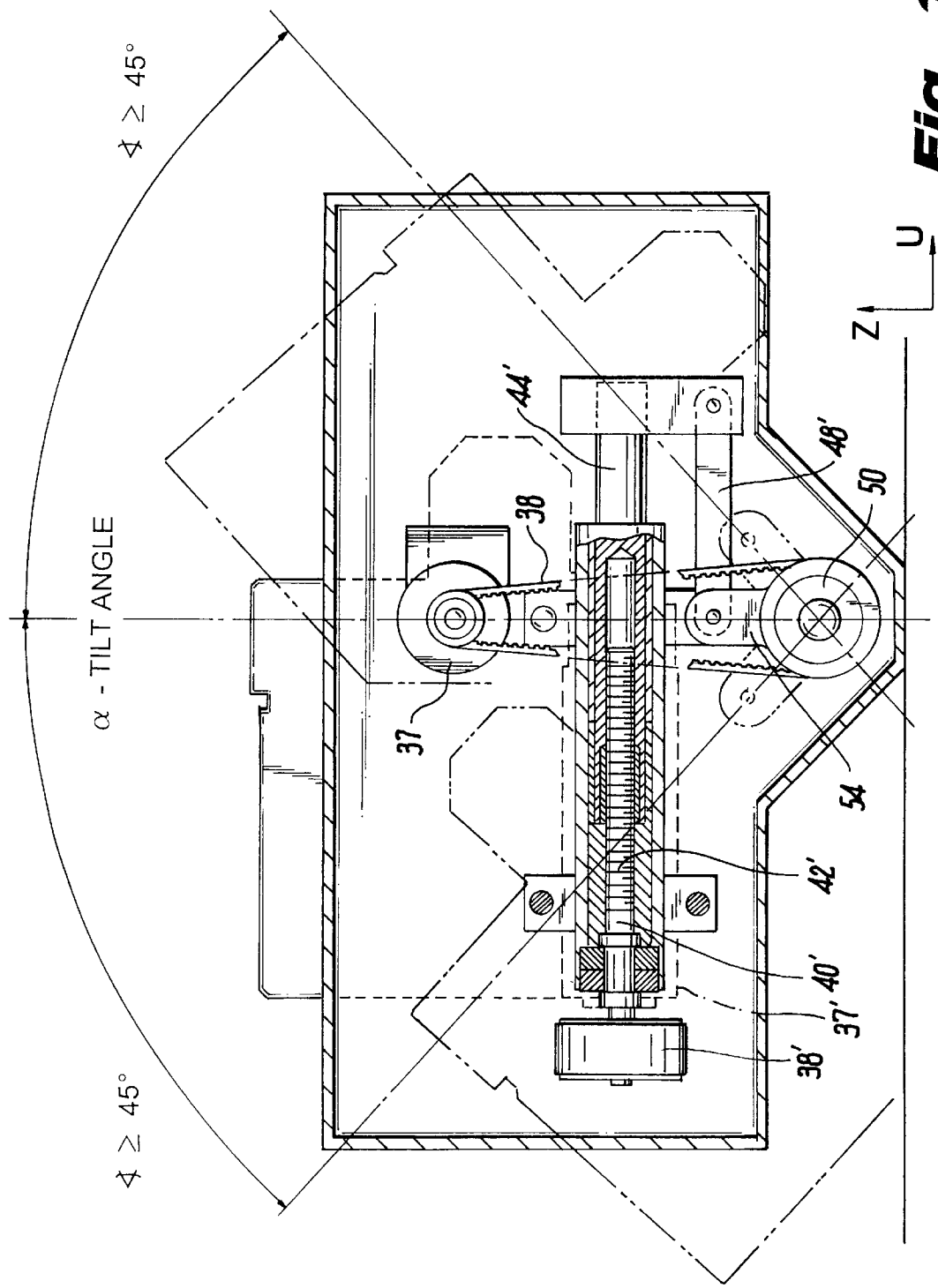
FIG. 3 a, b illustrate a cross-section (FIG. 3a) and a longitudinal section taken along the lines I—I in FIG. 3a (FIG. 3b) of a tilt drive for tilting a wire guide assembly along two tilt axes.

FIGS. 3a and 3b show two tilt drives of the kind described above which are coupled together and which enable tilting of the upper wire guide assembly 10 of a wire-cut erosion apparatus about both tilt angles α and β. This tilt system is shown in FIG. 3a as a cross-section along the Z/V plane: According to the tilt drive shown in FIG. 2, the motion of the motor shaft of a servo motor 37 is transmitted via a belt 38 to a rotating shaft 40 which cooperates with a sliding shaft via a screw thread, such that the rotation motion of the rotating shaft 40 is transformed into a linear motion of the sliding shaft 44 and then transmitted via a hinge lever 48 as a tilt motion to the wire guide assembly 10. This leads to a tilt of the wire guide assembly 10 about a tilt angle β.

In order to further improve the tilt drive described in FIG. 2, another coaxial rotating shaft 50 is provided—which surrounds the rotating shaft 40 and the sliding shaft 44—and which is rotatably supported and rigidly connected to the supporting beam 52. When the rotating shaft 40' is turned, the wire guide assembly 10 will also rotate about the axis of the rotating shaft 50, i.e. in the plane defined by the Z- and U-axes about the tilt angle α. At the end opposite from the wire guide assembly, the rotating shaft 50 is provided with a flange 54, to which the second tilt drive of the tilt system for tilting about the angle α is coupled. In all other aspects, the second tilt drive is constructed in the same way as the tilt drive shown in FIG. 2.

This is illustrated in FIG. 3b, which shows a longitudinal section along the line I—I of FIG. 3a. Here, too, a servo motor 37'—indicated in the present representation by broken lines and positioned behind the tilt drive—cooperates with a rotating shaft 40' of the tilt drive via a belt 38'. The rotating shaft 40' transmits the rotating motion via a screw thread 42' to a linear motion of a sliding shaft 44', to the end of which a hinge lever 48' is attached—this is the end which points away from the rotating shaft 40. The other end of the hinge lever 48' is flexibly coupled to the flange 54 of the rotating shaft 50. In this way, the linear motion of the sliding shaft 44' is transformed into a rotating motion of the rotating shaft 50 of the first tilt drive and transmitted by the rotating shaft 50 as tilt motion directly to the wire guide assembly 10. By this method, the electronically controlled servo motor 37' provides the tilt adjustment of the wire guide assembly 10 about the angle $\alpha$. Both tilt drives—the first one for tilting about the angle $\beta$ and the second one for tilting about the angle $\alpha$—comprise linear drives—which generate a translational motion and which are coupled crosswise to each other. This coupled tilt system allows tilt positions in excess of 45° in the Z/V plane (tilt angle $\beta$), in the Z/U plane (tilt angle $\alpha$), as well as a combination thereof ($\beta$- and $\alpha$-tilt angles simultaneously adjustable).

The representations of the wire guide assembly 10 in FIGS. 3a and 3b shown in broken lines are examples which illustrate extreme tilt positions of the proposed tilt system in one of the Z/V and Z/U planes, respectively.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An electroerosion apparatus having a machining zone, comprising:

an upper tiltable electrode guide assembly tiltable electrode guide assembly for guiding a machining electrode;

wherein the upper tiltable electrode guide assembly is independently tiltable about a first upper tilt axis and a second upper tilt axis, the first upper tilt axis is associated with a first upper tilt drive and the second upper tilt axis is associated with a second upper tilt drive;

wherein the lower tiltable electrode guide assembly is independently tiltable about a first lower tilt axis and a second tilt lower axis, the first lower tilt axis is associated with a first lower tilt drive and the second lower tilt axis is associated with a second lower tilt drive;

wherein each of the upper and lower tilt drives comprises a servo motor; and wherein each servo motor is disposed outside the machining zone and is mechanically connected with connecting means to a respective one of the upper tiltable electrode guide assembly and the lower tiltable electrode guide assembly.

2. The electroerosion apparatus according to claim 1, further comprising a machine frame; and wherein each servo motor is disposed on the machine frame and is electrically controllable by a controller and is connected via a support arm to the upper and lower tiltable electrode guide assembly respectively.

3. The electroerosion apparatus according to claim 1, wherein the connecting means is a linear drive.

4. The electroerosion apparatus according to claim 3, wherein the linear drive is a rack and pinion drive.

5. The electroerosion apparatus according to claim 3, further comprising a gear coupled to the linear drive.

6. The electroerosion apparatus according to claim 5, wherein the gear is at least one of a linear screw gear and a toothed belt gear.

7. The electroerosion apparatus according to claim 5, wherein the upper tiltable electrode guide assembly and the lower tiltable electrode guide assembly are tilted such as to be in coaxial relation to each other.

8. An electroerosion apparatus having a machining zone, comprising:

at least one tiltable electrode guide assembly for guiding a machining electrode;

the at least one tiltable electrode guide is tiltable about a first and second tilt axis, the first tilt axis is associated with a first tilt drive and the second tilt axis is associated with a second tilt drive;

each tilt drive comprises a servo motor; and each servo motor is disposed outside the machining zone and is mechanically connected with connecting means to the at least one tiltable electrode guide assembly;

wherein the connecting means is a linear drive;

wherein the linear drive further comprises a rotating shaft driven by a motor shaft of each respective servo motor;

wherein a sliding shaft coupled to the rotating shaft for transforming rotating motions of the rotating shaft into linear motions of the sliding shaft; and wherein the sliding shaft is flexibly connected via a hinge lever to the electrode guide assembly.

9. The electroerosion apparatus according to claim 8, wherein each servo motor comprises one of a mechanical device and electronic device for stepping down the motor shaft motion.

10. An electroerosion apparatus according to claim 8, wherein the first tilt drive for the first tilt axis cooperates with the second tilt drive in that the sliding shaft of the first tilt drive is flexibly coupled to a rotating shaft of the second tilt drive such that the linear motion of the sliding shaft is transformed into rotating motion of the rotating shaft.

11. The electroerosion apparatus according to claim 10, further comprising a U/V slide and wherein each servo motor is translatably moveable on the U/V slide.

12. The electroerosion apparatus according to claim 8, wherein the rotating shaft is provided with an external thread which cooperates with an internal thread of the sliding shaft.

13. The electroerosion apparatus according to claim 8, wherein each motor shaft of each servo motor comprises a sensor for determining an output representing a tilt angle, wherein the output of each sensor is supplied to the controller for each servo motor.

14. The electroerosion apparatus according to claim 13, further comprising a motion control device for correcting a non-directly proportional motion of each motor shaft and each tilt motion of the electrode guide assembly according to the measurement of each sensor.

* * * * *